US012647335B2

(12) United States Patent
    Ibryam

(10) Patent No.: US 12,647,335 B2
(45) Date of Patent: Jun. 2, 2026

(54) MANAGING SERVICE LEVEL AGREEMENTS BY A DISTRIBUTED LEDGER NETWORK

(71) Applicant: RED HAT, INC., Raleigh, NC (US)

(72) Inventor: Bilgin Ismet Ibryam, London (GB)

(73) Assignee: Red Hat, Inc., Raleigh, NC (US)

( * ) Notice: Subject to any disclaimer, the term of this patent is extended or adjusted under 35 U.S.C. 154(b) by 430 days.

(21) Appl. No.: 17/936,358

(22) Filed: Sep. 28, 2022

(65) Prior Publication Data

US 2024/0106725 A1     Mar. 28, 2024

(51) Int. Cl.
    *H04L 41/50* (2022.01)
    *G06F 9/50* (2006.01)
    *H04L 41/5006* (2022.01)
    *H04L 41/5009* (2022.01)

(52) U.S. Cl.
    CPC ........ H04L 41/5096 (2013.01); G06F 9/5005 (2013.01); H04L 41/5006 (2013.01); H04L 41/5012 (2013.01)

(58) Field of Classification Search
    CPC ............. H04L 41/5096; H04L 41/5006; H04L 41/5012; H04L 41/5009; G06F 9/5005; G06F 9/5027; G06F 2209/503
    See application file for complete search history.

(56) References Cited

U.S. PATENT DOCUMENTS 7,007,082 B2    2/2006  Harasawa
7,269,652 B2    9/2007  Chen et al.

7,523,041 B2     4/2009   Chen et al.
10,833,960 B1 *  11/2020  Ranchal .............. H04L 41/5009
2011/0153511 A1   6/2011   Han et al.
2014/0129444 A1   5/2014   LeRoy
2019/0036778 A1 *  1/2019   Bathen ................ H04L 41/5006
2019/0158674 A1 *  5/2019   Nelson ...................... H04L 9/50

(Continued)

FOREIGN PATENT DOCUMENTS

EP        4030327 A1 *   7/2022   .............. H04L 9/50
KR        2209941 B1 *   2/2021   ........... H04L 43/091

OTHER PUBLICATIONS

English translation for KR-102209941-B1, retrieved from FIT databases accessed by USPTO; (Year: 2021).*

(Continued)

*Primary Examiner* — Patrice L Winder
(74) *Attorney, Agent, or Firm* — Womble Bond Dickinson (US) LLP

(57) ABSTRACT

Terms of a SLA between a user device of a computing system and a service provider of the computing system are identified. The service provider is to provide a service to the user device in accordance with the terms of the SLA. The terms are translated into a sequence of instructions corresponding to a smart contract, where the smart contract is to provide the user device with a service credit based on an availability of a service for the time interval and in accordance with the SLA. The sequence of instructions is transmitted to a first node of a distributed ledger network. Availability data indicating an availability of the service at the user device during each time period of a time interval is obtained. The availability data is provided to a second node of the distributed ledger network to cause the second node to execute the sequence of instructions.

20 Claims, 6 Drawing Sheets

(56) References Cited

U.S. PATENT DOCUMENTS

| | | | | |
|---|---|---|---|---|
| 2020/0007414 | A1* | 1/2020 | Smith | H04L 67/12 |
| 2020/0057860 | A1* | 2/2020 | Patil | H04L 41/5019 |
| 2020/0367129 | A1* | 11/2020 | Raheem | H04L 41/5009 |
| 2021/0263909 | A1* | 8/2021 | Paracha | H04L 9/50 |
| 2022/0253841 | A1* | 8/2022 | Lee | H04W 12/00 |
| 2022/0253866 | A1* | 8/2022 | Tedesco | H04L 65/60 |
| 2022/0256340 | A1* | 8/2022 | Lee | H04M 15/51 |

OTHER PUBLICATIONS

Scheid, Eder J., Bruno B. Rodrigues, Lisandro Z. Granville, and Burkhard Stiller. "Enabling dynamic SLA compensation using blockchain-based smart contracts." In 2019 IFIP/IEEE Symposium on Integrated Network and Service Management (IM), pp. 53-61. IEEE. (Year: 2019).*
Eder J. Scheid et al., "Enabling Dynamic SLA Compensation Using Blockchain-based Smart Contracts", https://ieeexplore.ieee.org/abstract/document/8717859, 9 pages, 2019, Communication Systems Group CSG, University of Zürich UZH; Institute of Informatics INF, Federal University of Rio Grande do Sul UFRGS.
Huan Zhou et al., "Trustworthy Cloud Service Level Agreement Enforcement with Blockchain based Smart Contract" https://www.researchgate.net/publication/329959122_Trustworthy_Cloud_Service_Level_Agreement_Enforcement_with_Blockchain_Based_Smart Contract, 6 pages, Dec. 2018, Informatics Institute, University of Amsterdam, Amsterdam, Netherlands; School of Computer Science, National University of Defense Technology, Changsha, China.
Eder John Scheid et al., "Automatic SLA Compensation based on Smart Contracts", https://files.ifi.uzh.ch/CSG/staff/scheid/extern/publications/IFI-2018.02.pdf, 10 pages, Apr. 2018, Communication Systems Group (CSG), Department of Informatics (IFI) University of Zurich (UZH), Switzerland.

* cited by examiner

300

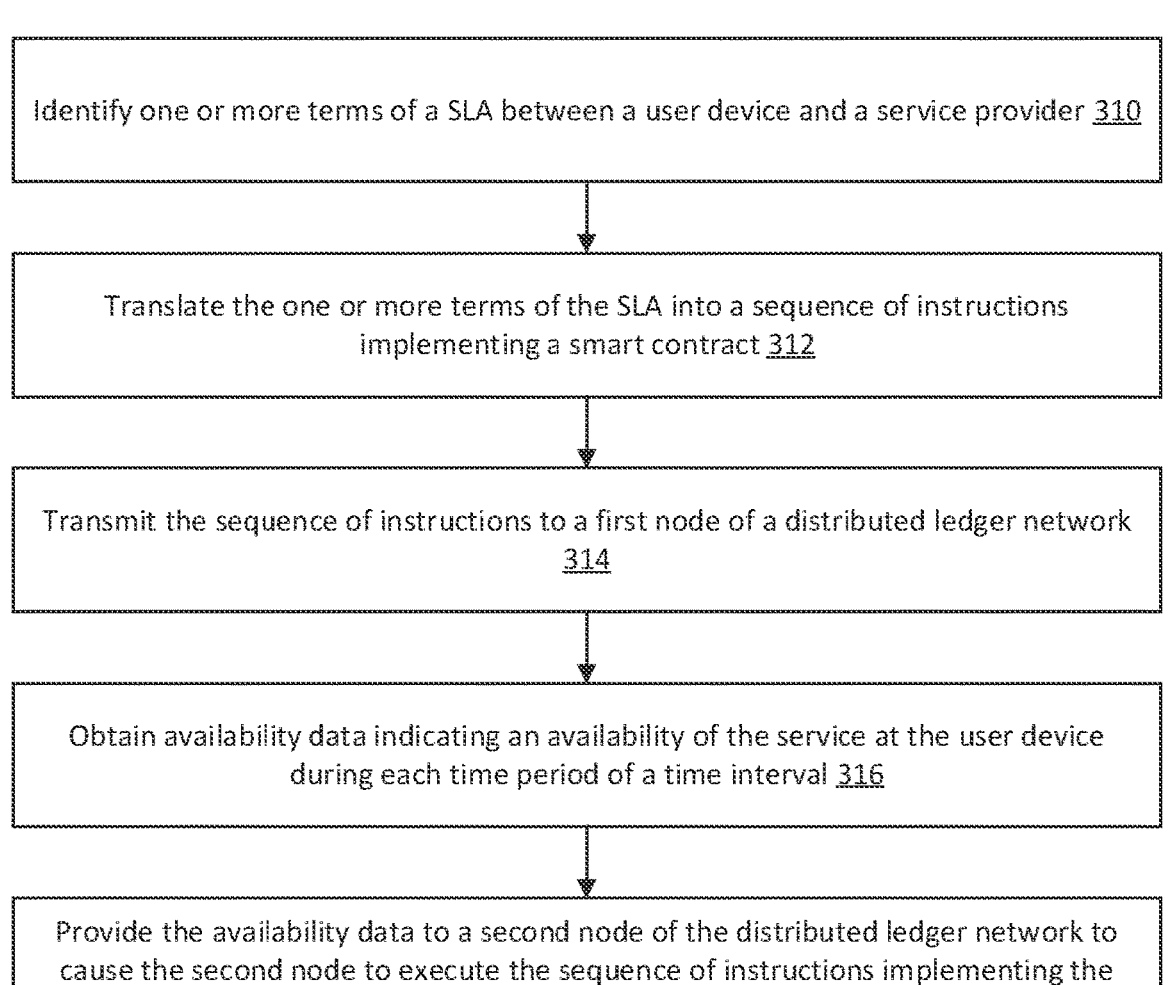

Identify one or more terms of a SLA between a user device and a service provider 310

Translate the one or more terms of the SLA into a sequence of instructions implementing a smart contract 312

Transmit the sequence of instructions to a first node of a distributed ledger network 314

Obtain availability data indicating an availability of the service at the user device during each time period of a time interval 316

Provide the availability data to a second node of the distributed ledger network to cause the second node to execute the sequence of instructions implementing the smart contract 318

FIG. 3

500

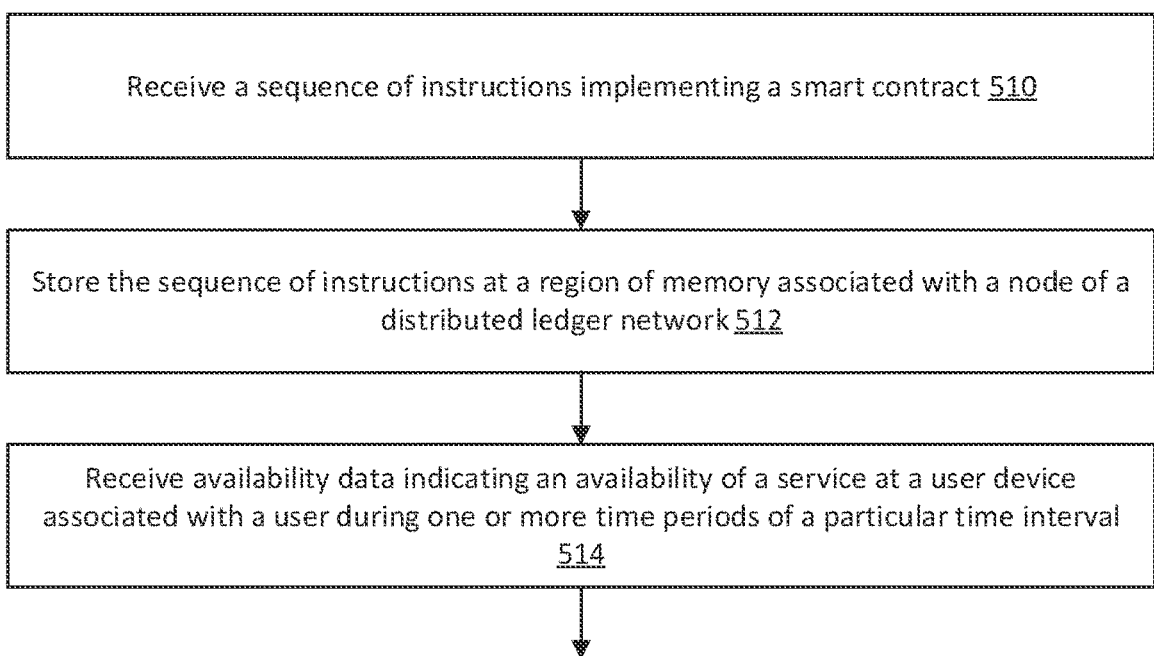

Receive a sequence of instructions implementing a smart contract 510

Store the sequence of instructions at a region of memory associated with a node of a distributed ledger network 512

Receive availability data indicating an availability of a service at a user device associated with a user during one or more time periods of a particular time interval 514

Execute the sequence of instructions to provide the user device with a service credit based on the availability data for the time interval and in accordance with a service level agreement (SLA) 516

FIG. 5

MANAGING SERVICE LEVEL AGREEMENTS BY A DISTRIBUTED LEDGER NETWORK

TECHNICAL FIELD

Embodiments of the present disclosure relate to computing systems, and more specifically, relate to managing service level agreements by a distributed ledger network.

BACKGROUND

A service level agreement (SLA) is an agreement between a user and a cloud service provider. The user (e.g., an enterprise user) can be associated with one or more end users of a cloud-based network provided by the cloud service provider. The SLA can specify a type and/or amount of resources (e.g., server uptime, persistent storage, software application instantiation, network performance, cloud storage, support response time, etc.) in the cloud-based network that are to be provided for use by the end users. In return, the user can be charged a specified rate in proportion to the type and/or amount of specified resources. The SLA can further detail any remedies or adjustments for any service failure associated with the use of the resources in the cloud-based network. For example, the SLA can provide a service credit to which the user is entitled to per a particular duration of service failure or outage.

BRIEF DESCRIPTION OF THE DRAWINGS

The disclosure is illustrated by way of example, and not by way of limitation, and can be more fully understood with references to the following detailed description when considered in connection with the figures, in which:

FIG. 3 is a flow diagram illustrating an example method for managing service level agreements by distributed ledgers, in accordance with embodiments of the present disclosure.

FIG. 5 is a flow diagram of another example method for managing service level agreements by distributed ledgers, in accordance with embodiments of the present disclosure.

DETAILED DESCRIPTION

Figure 1:
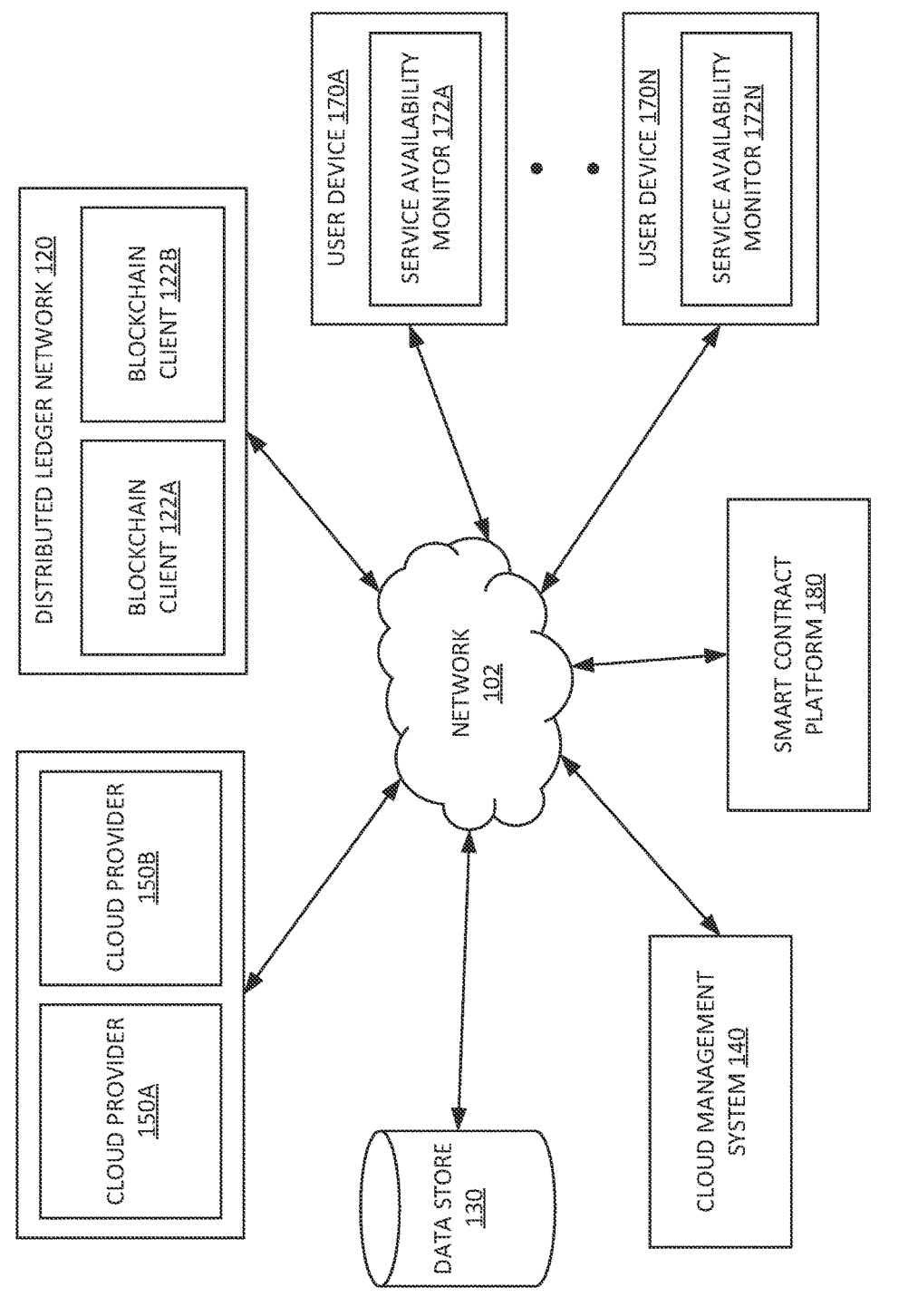
FIG. 1 illustrates a high-level component diagram of an example architecture, in accordance with one or more aspects of the present disclosure.

Described herein are methods and systems for managing service level agreements by distributed ledgers. A service level agreement (SLA) refers to an agreement between a user (e.g., an enterprise) and a cloud service provider that defines a type and amount of one or more cloud-based network services and/or resources (e.g., server uptime, persistent storage, software application instantiation, network performance, cloud storage, support response time, etc.) to be provided by the cloud service provider to the user. Such services and/or resources are referred to as "services" or "contracted services" herein. In return for the services, the user can be charged a specified rate in proportion to the type and/or amount of specified resources.

A SLA can further detail any remedies or adjustments for a service failure associated with the use of the resources. For example, the SLA can provide that the user of the provided services is entitled to a service credit that is proportional to a number and/or duration of service downtime within a particular time interval (e.g., a day, a week, a month, etc.). In some systems, the user can track (e.g., using computing resources of the user) an amount of time within the time interval during which the services are unavailable. The user can submit a request to the service provider (e.g., at the end of the time interval) requesting a service credit that is proportional to the tracked amount of time, in accordance with the terms of the SLA. In response to the request, the service provider can verify (e.g., via computing resources of the service provider) that the contracted services were unavailable for the amount of time indicated by the request and/or whether the service provider was responsible for the unavailability of the services. Upon verification, the service provider can provide the requested service credit to the user. In some instances, the service provider applies the service credit as a reduction to the rate charged to the user for the services during a subsequent time interval.

Unavailability of contracted services may not occur during consecutive time periods of the time interval specified by the SLA. For example, contracted services may not be available to the user during a given time period of the time interval and may become available to the user during a subsequent time period of the time interval. The services may again become unavailable for another subsequent time period of the time interval and may again become available during yet another subsequent time period of the time interval. A cycle of availability and unavailability of the services can repeat a significant number of times during the time interval specified by the SLA. Further, the respective time periods during which the services are unavailable can be relatively short (e.g., one or more seconds, one or more minutes, etc.), in some instances, even though the total amount of unavailability during the time interval can be sufficient to entitle the user to a service credit, per the SLA. Detecting and tracking each time period of the time interval during which resources are unavailable can consume a significant amount of computing resources (e.g., processing cycles, memory resources, etc.) for both the user and the service provider. Such computing resources are therefore not available for other processes of the computing system, which can increase an overall latency and decrease an overall efficiency of the computing system. Due to the significant amount of computing resources that are consumed to detect and track service downtimes, the user may decide not to track service downtimes that are less than a particular duration (e.g., less than a minute, less than a few seconds, etc.). Accordingly, the user may not track each service downtime during the time interval and therefore may request a service credit of an amount that is less than what the user is entitled to per the SLA.

Implementations of this disclosure address the above-mentioned and other deficiencies by providing techniques to manage service level agreements by a distributed ledger network. A service level agreement (SLA) enforcement component (e.g., of a smart contract platform) can translate terms of a SLA between a user (e.g., an enterprise user) and a service provider into a sequence of instructions corresponding to a smart contract. A smart contract refers to one or more programs that are stored on a distributed ledger network (e.g., a blockchain) and are executed (e.g., by one or more nodes of the distributed ledger network) when one or more conditions are met. A smart contract platform refers to an environment in which software is executed to facilitate execution a smart contract. In some instances the smart contract platform can include remote computing resources that can execute the one or more programs of the smart contract. The SLA enforcement component (also referred to as a SLA enforcer herein) can transmit the sequence of instructions to a node of a distributed ledger network and the node can store the sequence of instructions at one or more blocks of the node (or blocks of another node of the distributed ledger network).

In some embodiments, one or more components of the smart contract platform can provide an availability monitoring component to a user device associated with the user (e.g., an endpoint device). The availability monitoring component can be configured to collect data associated with services provided by the services provided by the service provider to the user and transmit the collected data to the SLA enforcement component. The availability monitoring component can be an oracle, in some embodiments. An oracle refers to a component (e.g., a software component, a hardware component, or a combination thereof) that enables a smart contract to access data from entities outside of the distributed ledger network. Further details regarding the availability monitoring component are provided herein.

In some embodiments, the SLA can define a time interval (e.g., an hour, a day, a month, etc.) for which a user maybe entitled to a service credit for unavailable services. The SLA enforcer can monitor availability of services to the user based on data collected by the availability monitoring component at the user device. In an illustrative example, the availability monitoring component can transmit collected data associated with the provided services to the SLA enforcer (e.g., via a network). The SLA enforcer can determine the availability of the provided service based on the collected data. In some embodiments, the SLA enforcer can provide the availability data to one or more nodes of the distributed ledger network. The one or more nodes of the distributed ledger network can, in some embodiments, execute the sequence of instructions corresponding to the smart contract to determine whether the user is entitled to a service credit based on the availability data and in accordance with the SLA. In additional or alternative embodiments, the one or more nodes can execute the sequence of instructions to provide the user with the service credit.

Aspects of the present disclosure address the above and other deficiencies by providing techniques to provide service credits to users of services or resources automatically based on detected service downtime at an endpoint device of the user. The SLA enforcer is able to determine an availability of contracted services for each time period of a time interval, as defined by a SLA between the user and the service provider. The SLA enforcer can send data indicating the determined availability to one or more nodes of a distributed ledger network. The nodes of the distributed ledger network can execute instructions corresponding to a smart contract (e.g., without a request from the user or the service provider) to provide the user with the service credit, in accordance with the terms of the SLA. Accordingly, neither the user nor the service provider would need to track the availability of a contracted service using its respective computing resources, making such computing resources available to other processes of the system. Thus, an overall efficiency of the system is increased and an overall latency of the system is decreased. In addition, embodiments of the present disclosure enable the tracking of each time period of the time interval during which contracted services are unavailable, regardless of the length of the time period, which can align the amount of the service credit to which the user receives more closely with the terms of the SLA. Accordingly, the service provider can be incentivized to improve the availability of such contracted services, making such services available to the user and therefore further improving an overall efficiency, latency, and throughput of the computing resources associated with the user and, in some instances, of the overall system.

FIG. 1 illustrates a high-level component diagram of an example system architecture 100, in accordance with one or more aspects of the present disclosure. In some embodiments, system architecture 100 can be used in a containerized computing service platform, such as a Platform-as-a-Service (PaaS) system (e.g., OpenShift®). The PaaS system can provide resources and services (e.g., microservices) for the development and execution of applications owned or managed by multiple users. The PaaS system provides a platform and environment that enables users to build applications and services in clustered computing environment (e.g., a cloud computing environment). Although implementations of the present disclosure are described in accordance with a particular type of system, this should not be considered as limiting the scope or usefulness of the features of this disclosure. For example, the features and techniques described herein can be used with other types of multi-tenant systems and/or other containerized computing service platforms.

As shown in FIG. 1, service architecture 100 includes a distributed ledger network 120 coupled to user devices 170 (e.g., user device 170A, user device 170B, etc.), a cloud management system 140, one or more cloud providers (e.g., cloud provider 150A, cloud provider 150B, etc.), data store 130, and/or a smart contract platform 180 via a network 102. Network 102 can include a private network (e.g., a local area network (LAN), a wide area network (WAN), intranet, or other similar private networks) or a public network (e.g., the Internet), in some embodiments. Distributed ledger network 120 can include one or more block chain clients 122 (e.g., block chain client 122A, blockchain client 122B, etc.) across one or more machines, such as server computers, desktop computers, or any other type of computing device. Each blockchain client 122 can store data (e.g., availability data) locally in each blockchain client's local storage. Each blockchain client 122 can be or otherwise correspond to a node of distributed ledger network 120. Further details regarding distributed ledger network 120 are provided with respect to FIG. 2.

User device(s) 170 can include a personal computer (PC), a laptop, a mobile phone, a tablet computer, or any other computing device. Each user device 170 can run an operating system (OS) that manages hardware and/or software of the user device 170. An application or a daemon (not shown) can run on user device 170 (e.g., via the OS of each user device 170. In some embodiments, a service availability monitor component 172 can run on each respective user device 170. For example, service availability monitor component 172A can run on user device 170A and service availability monitor component 172N can run on user device 170N, in some embodiments. Service availability monitor component 172 (referred to herein as "service availability monitor 172") can be provided to user device 170 via network 102 by smart contract platform 180, in some embodiments. Further details regarding service availability monitor component 172 are provided herein.

Cloud provider 150 can be configured to provide cloud-based network services and/or resources to users associated with a user device 170, in some embodiments. In some embodiments, cloud provider 150 and a user can enter into a service level agreement (SLA), which defines a type and/or amount of one or more cloud-based network services and/or resources to be provided by one or more cloud providers 150 (e.g., cloud provider 150A, cloud provider 150B, etc.) to a user device 170 (e.g., an endpoint device) associated with the user. Cloud-based network services and/or resources can include computing service uptime (e.g., server uptime), persistent storage, software application instantiation, network performance, cloud storage, support response time, etc. In some embodiments, user device 170 can access the contracted services provided by cloud provider 150 via network 102.

In some embodiments, the SLA can further define any remedies or adjustments for a service failure associated with the user of the services and/or resources. A service credit can correspond to a refund of a portion of an amount paid by the user to the service provider to access the contracted services. The amount of the service credit can be proportional to the length of time and/or severity of the service outage. In one illustrative example, the SLA can provide that the user is entitled to a service credit of approximately 10% if an amount of time that a contracted service is unavailable to the user device 170 (e.g., within a particular time interval) falls below 99.99%. In another illustrative example, the SLA can provide that the user is entitled to a service credit of approximately 25% if an amount of time that the contracted service is unavailable falls below 99%. In some embodiments, a service credit can be provided to a user by applying the amount of the service credit as a reduction of fees paid by the user for future services provided by the service provider. For example, if the user is entitled to a service credit of approximately 25% of the cost paid by the user for services provided during a time interval, the service credit may be applied as a 25% reduction in fees paid by the user to the service provider for services provided during a subsequent time interval.

Data store 130 can be implemented on one or more machines, such as server computers, desktop computers, or any other type of computing device. An example of data store 130 includes a persistent storage that is capable of storing data collected from various data sources including local and remote computing devices such as desktop computers, laptop computers, handheld computers, server computers, gateway computers, mobile communications devices, cell phones, smart phones, or similar computing device. In some embodiments, the data store 130 can be or otherwise include a network-attached file server, while in other embodiments the data store 130 can be or otherwise include another type of persistent storage such as an object-oriented database, a relational database, and so forth. Data store 130 can be coupled to a cloud resource provisioning component (not shown) directly or via a network (e.g., network 102 or another network). In an example, data store 130 can be a relational database management system (RDBMS) used for the storage of information for cloud providers. In an example, data store 130 can include processing logic to enable the cloud resource provisioning component to search for and retrieve data relating to cloud providers, including cloud resource parameters.

A blockchain client 122 can include one or more components (e.g., hardware components, software components, a combination thereof, etc.) that connects to other clients 122 of distributed ledger network 120 (e.g., in a peer-to-peer manner). Each client 122 can communicate with other clients 122 of distributed ledger network 120. For example, blockchain client 122A can connect to and communicate with blockchain client 122B. One or more components of blockchain client 122A can reside or otherwise execute using different computing resources than components of blockchain client 122B. Each blockchain client 122 can include or otherwise correspond to a node of distributed ledger network 120, in some embodiments. As indicated above, each blockchain client 122 can obtain data (e.g., availability data) and can store such data in each blockchain client's local storage. Each blockchain client 122 can be configured to execute instructions (or cause another blockchain client 122) to execute instructions corresponding to a smart contract, in accordance with embodiments described herein.

Smart contract platform 180 can be configured to create and/or manage smart contracts. As indicated above, a smart contract refers to one or more programs that are stored on a distributed ledger network (e.g., distributed ledger network 120) and are executed when one or more conditions are met (e.g., by a blockchain client 122). Smart contract platform 180 refers to an environment in which software is executed to facilitate execution of one or more smart contracts. In some embodiments, smart contract platform 180 can include one or more computing resources (e.g., of system 100) that execute the one or more programs of the smart contract. In some embodiments, smart contract platform 180 can be configured to create and/or manage a smart contract based on a service level agreement (SLA) between a provider of cloud-based network services and/or resources (e.g., server uptime, persistent storage, software application instantiation, network performance, cloud storage, support response time, etc.) and a user of the provided services and/or resources. For example, smart contract platform 180 can obtain a SLA between the provider and the user (e.g., via data store 130, from one or more of user devices 170, etc.). Smart contract platform 180 can translate terms of the SLA into a sequence of instructions corresponding to a smart contract. Smart contract platform 180 can provide the translated terms of the SLA to one or more blockchain clients 122 of distributed ledger network 120. The one or more blockchain clients 122 can store the sequence of instructions in local storage of the one or more blockchain clients 122, as described above.

Smart contract platform 180 can deploy service availability monitor 172 to a user device 170 (e.g., an endpoint device) associated with the user of the contracted services. In some embodiments, smart contract platform 180 can provide a module (e.g., a software module) including instructions associated with one or more features of service availability monitor 172 to user device 170. Computing resources of user device 170 (e.g., a processing device, etc.) can execute the instructions responsive to receiving the module from smart contract platform 180. Service availability monitor 172 can collect data associated with an availability of a contracted service at the endpoint device, in some embodiments. In some embodiments, service availability monitor 172 can monitor a performance of one or more operations at user device 170 (e.g., operations associated with a service provided by a service provider) and can track data indicating a success or failure of the operations, an amount of time for completion of the operation, and so forth. In an illustrative example, an availability of a contracted service can be measured by server uptime. Service availability monitor 172 can monitor and collect data indicating a response time of a server machine providing contracted services to users, a throughput of the server to handle requests associated with the contracted services, etc. In other or similar embodiments, the data collected by service availability monitor 172 can include other types of data, which may be particular to the type of service provided by the contracted services. For example, a contracted service provided at an endpoint device can correspond to a messaging system. Service availability monitor 172 can collect data indicating an ability of client applications at the endpoint device to send and receive messages. In some embodiments, service availability monitor 172 can be an oracle. In such embodiments, service availability monitor 172 can determine an availability of the contracted service based on the collected data and can report the collected data directly to one or more blockchain clients 122. In other or similar embodiments, service availability monitor 172 can provide the collected data to smart contract platform 180. Smart contract platform 180 can determine an availability of the contracted service based on the collected data and can provide data indicating the availability to one or more blockchain clients 122.

In response to obtaining the availability data (e.g., from service availability monitor 172 and/or smart contract platform 180), a respective blockchain client 122 can store the availability data in local storage of the respective blockchain client 122, as described above. In some embodiments, the blockchain client 122 can store availability data for each time period of a time interval in local storage of the blockchain client 122. For example, if a time interval is defined in the SLA to be approximately one hour, blockchain client 122 can store availability data for each time period (e.g., each second, each minute, etc.) of the time interval in the local storage of the blockchain client 122. In another example, if a time interval is defined in the SLA to be approximately one month, blockchain client 122 can store availability data for each time period of the month in the local storage of the blockchain client 122. The blockchain client 122 can execute the sequence of instructions corresponding to the smart contract (e.g., at the end of the time interval), in some embodiments. In some embodiments, the blockchain client 122 can execute the sequence of instructions to provide a service credit to the user device 170 associated with the user of the contracted services, in accordance with the SLA. Further details regarding creating the smart contract, monitoring the availability of contracted services, and providing a service credit to the user of the contracted services are provided herein.

Figure 2:
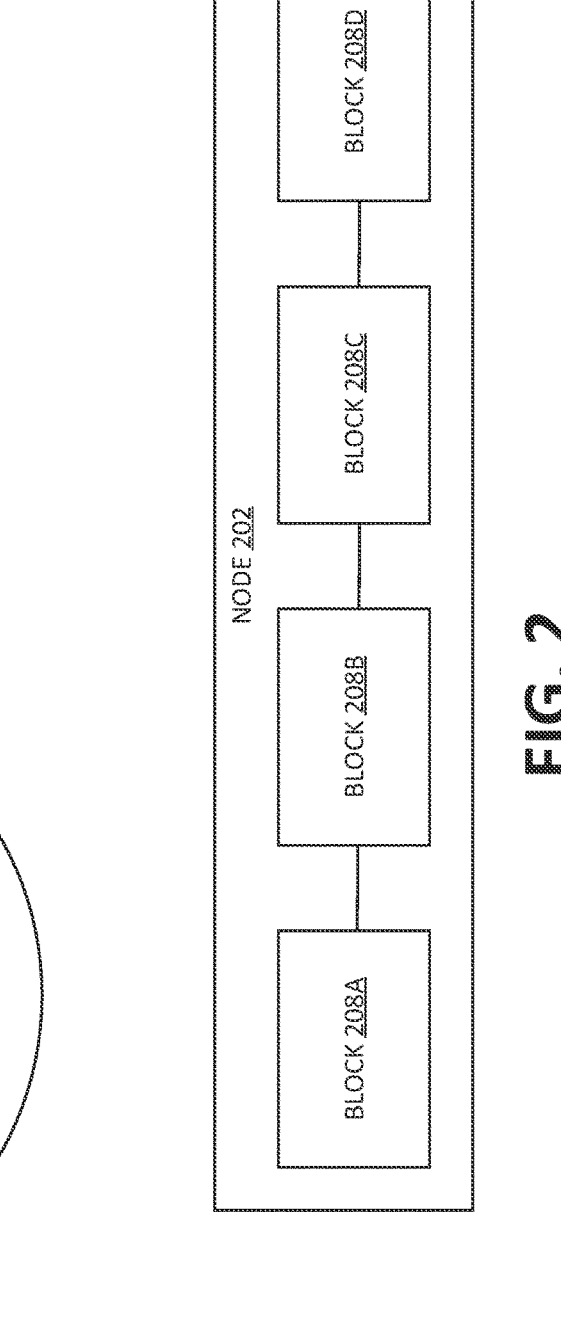
FIG. 2 illustrates an example distributed ledger, in accordance with embodiments of the present disclosure.

FIG. 2 illustrates an example distributed ledger network 120, in accordance with embodiments of the present disclosure. In some embodiments, distributed ledger network 120 can include one or more nodes (e.g., node 202, node 204, node 206) that maintain one or more portions of a distributed ledger. A distributed ledger 120 can be a blockchain, in some embodiments. A blockchain is a type of distributed ledger that is used, for example, in a Bitcoin crypto-currency system. The blockchain is a data structure including a complete history of each block 208 in the distributed ledger network 120 from the first block (e.g., block 208A) to the most recently added block (e.g., block 208D). Each node of the distributed ledger network 120 can maintain a copy of all or a portion of the distributed ledger in storage (e.g., on disk or in RAM) that is local to the node. For example, each node 202, 204, and/or 206 can receive a copy of the distributed ledger upon joining the network. In accordance with embodiments described herein, nodes 202, 204, and/or 206 can correspond to one or more of blockchain clients 122, as described with respect to FIG. 1. In some embodiments, distributed ledger can be a public ledger that is maintained by distinct individual computer systems each operated by different entities that maintain a single blockchain. In additional or alternative embodiments, the distributed ledger can be maintained by one or more individual computing system that are operated by a single entity (e.g., a private or a closed system).

Nodes 202, 204, and/or 206 can sequentially record data into the distributed ledger of distributed ledger network 120 as blocks of data. For example, each of nodes 202, 204, and 206 can be operated to "process" blocks 208 (e.g., blocks 208A, 208B, 208C, 208D) of the distributed ledger by validating data associated with each block 208. In some embodiments, only one node receives data that has been broadcasted over a network (e.g., by smart contract platform 180, by service availability monitor 172, etc.). Once the node receives the data, it can propagate the data to other participating nodes of the distributed ledger network 120. The other participating nodes can add the data to their copy of the distributed ledger.

Nodes 202, 204 and/or 206 can validate a new block that is added to the distributed ledger network 120 by applying an operation to data of the block. The operation can involve solving a computationally difficult problem that can be verified easily (e.g., using minimal computing resources). In some embodiments, the operation can be a hash operation. In an illustrative example, each node of distributed ledger network 120 can execute instructions (e.g., via one or more processing devices of a local computing system of the node) to attempt to compute a hash value for a respective block 208 of the node using a cryptographic hash function (e.g., a secure hash algorithm (SHA)-256 function, etc.). An input to the hash function can include data associated with the block 208, in some embodiments and an output of the hash function can include hash value that represents the data of the block 208. Nodes 202, 204, 206 can build blocks 208 that include a reference (e.g., a data pointer) to the hash value of the previously block 208 of the distributed ledger. As such, blocks 208 of the distributed ledger are explicitly ordered by reference to the previous blocks' hash value, which reflects the content of that previous block. In an illustrative example, block 208B is explicitly ordered by reference to the hash value of block 208A, block 208C is explicitly ordered by reference to the hash value of block 208B, block 208D is explicitly ordered by reference to the hash value of block 208C, and so forth.

It should be noted that although embodiments of the present disclosure describe distributed ledger network 120 as a blockchain, distributed ledger network 120 can include other types of distributed ledgers, in accordance with embodiments of the present disclosure. It should be further noted that although FIG. 2 depicts three nodes (e.g., nodes 202, 204, and 206) of distributed ledger network 120, distributed ledger network 120 can include any number of nodes. In addition, although FIG. 2 depicts node 202 as including four blocks (e.g., blocks 208A, 208B, 208C, and 208D), nodes 202, 204, and/or 206 can include any number of blocks. Further, any embodiments described respect to node 202 above can be applied to any other node (e.g., node 204, 206, etc.) of distributed ledger network 120.

Figure 4:
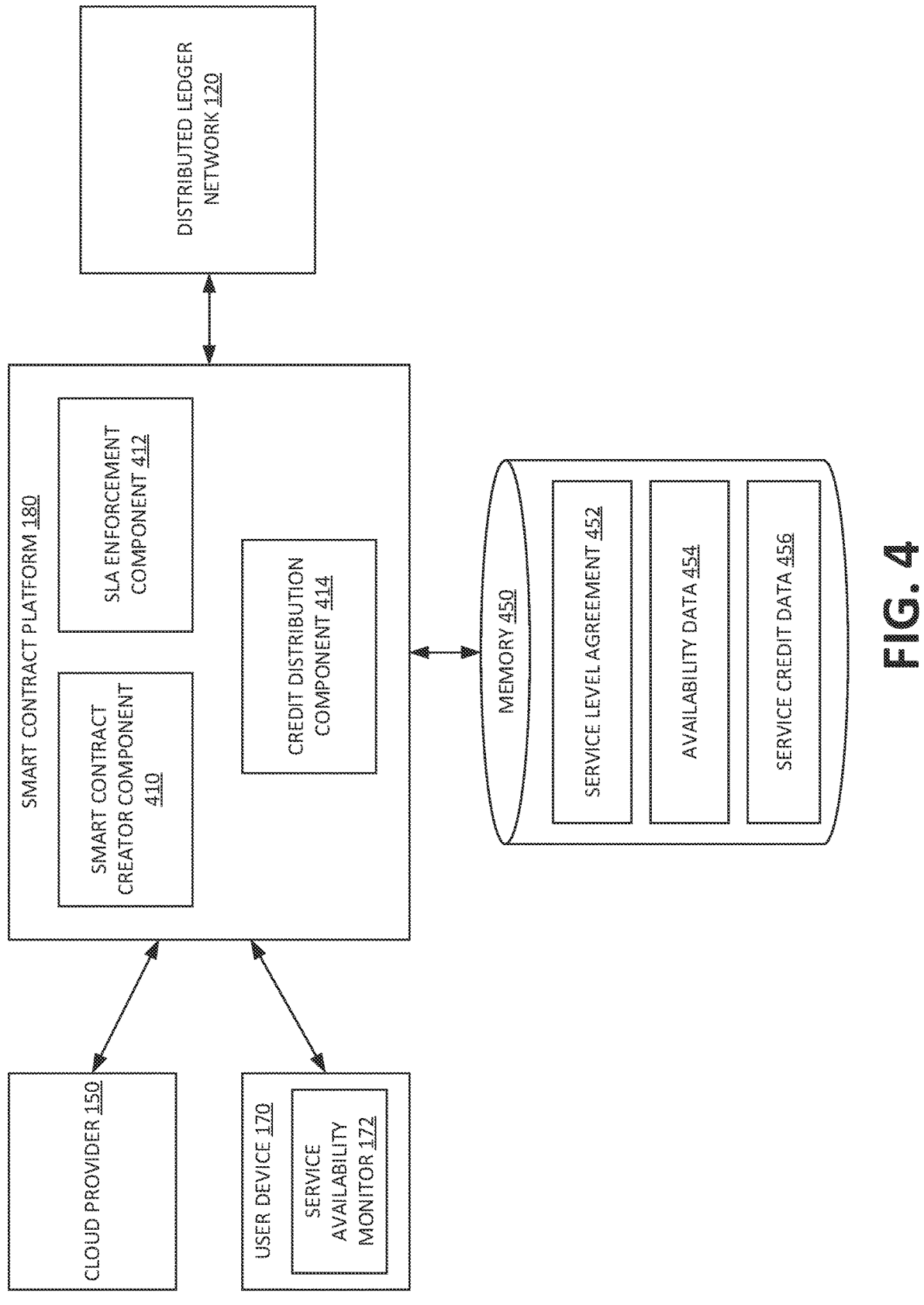
FIG. 4 depicts an example smart contract platform, in accordance with embodiments of the present disclosure.

FIG. 3 is a flow diagram illustrating an example method 300 for managing service level agreement breaches using distributed ledgers, in accordance with embodiments of the present disclosure. Method 300 can be performed by one or more components of smart contract platform 180, in accordance with previously described embodiments. For example, one or more operations of method 300 can be performed by smart contract creator component 410, SLA enforcement component 412, and/or credit distribution component 414 of smart contract platform 180, as illustrated in FIG. 4. Method 300 can be performed by processing logic that can comprise hardware (circuitry, dedicated logic, etc.), software (e.g., software executed by a general purpose computer system or a dedicated machine), or a combination of both. Method 300 and each of its individual functions, routines, subroutines, or operations can be performed by one or more processors of the computer device executing the method. In certain implementations, method 300 can each be performed by a single processing thread. Alternatively, method 300 can be performed by two or more processing threads, each thread executing one or more individual functions, routines, subroutines, or operations of the method.

At block 310, processing logic identifies one or more terms of a SLA between a user device of a computing system and a service provider of the computing system. The service provider can provide a service and/or resources to the user device in accordance with the one or more terms of the SLA, as described above. FIG. 4 depicts an example smart contract platform 180, in accordance with embodiments of the present disclosure. As illustrated in FIG. 4, smart contract platform 180 can be connected to a cloud provider 150, a user device 170, and/or a distributed ledger network 120 (e.g., via network 102), as described with respect to FIG. 1. Smart contract platform 180 can be connected to or can otherwise have access to memory 450, in some embodiments. Memory 450 can include memory resources that are managed or otherwise accessible to cloud provider 150, user device 170, and/or smart contract platform 180, in some embodiments. In other or similar embodiments, memory 450 can reside at data store 130.

In some embodiments, one or more of cloud provider 150 and/or user device 170 can provide the SLA to contract platform 180 (e.g., via network 102). Smart contract platform 180 can store the SLA at memory 450 as SLA 452, in some embodiments. In additional or alternative embodiments, SLA 452 can be stored at memory 450 (e.g., by cloud provider 150, by user device 170, etc.). Smart contract platform 180 can access SLA 452 at memory 450. In some embodiments, smart contract platform 180 can access SLA 452 in response to receiving a request to translate one or more terms of SLA 452 into a smart contract.

Referring back to FIG. 3, at block 312, processing logic translates the one or more terms of the SLA into a sequence of instructions implementing a smart contract. Smart contract creator component 410 (also referred to as "smart contract creator 410") can be configured to translate one or more terms of SLA 452 into the smart contract. In some embodiments, smart contract creator 410 can parse SLA 452 and can identify data of SLA 452 that corresponds to terms relating to entitlement and/or distribution of a service credit, as described above. In response to identifying such data, smart contract creator 410 can generate a sequence of instructions associated with detecting whether the user is entitled to the service credit and/or distributing the service credit to the user, in some embodiments. In an illustrative example, smart contract creator 410 can identify one or more terms of SLA 452 that indicate that the user is entitled to a service credit of approximately 10% if a contracted service is unavailable for 99.99% of a particular time interval and is entitled to a service credit of approximately 25% if the contracted service is unavailable for 99% of the particular time interval. Smart contract creator 410 can further identify one or more terms of SLA 452 that indicate metrics that are to be considered in determining availability of a contracted service. For example, smart contract creator 410 can identify a term of SLA 452 that provides that the contracted service is determined to be unavailable if one or more components of user device 170 is unable to establish a connection (e.g., via network 102) between user device 170 and computing resources of cloud provider 150. In additional or alternative embodiments, one or more of cloud provider 150 or user device 170 can provide a notification to smart contract creator 410 indicating the one or more terms of SLA 452 that are to be translated to the sequence of instructions.

In response to identifying the terms of SLA 452 that are to be translated into the sequence of instructions (e.g., by parsing SLA 452 and/or based on a notification provided by cloud provider 150 and/or user device 170), smart contract creator 410 can translate the identified terms into the sequence of instructions. Smart contract creator 410 can translate the identified terms into the sequence of instructions by generating one or more instructions that correspond to the logic of the identified terms of SLA 452. In an illustrative example, the identified terms of SLA 452 can provide that the user is entitled to a service credit of 10% if a contracted service is unavailable for 99.99% of a time interval. In such illustrative example, smart contract creator 410 can translate the identified terms into a sequence of instructions, such as the following:

```
if service_downtime >= 99.99% {
    servicecredit_amount = 10%
}
else {
    servicecredit_amount = 0%
}
```

It should be noted that smart contract creator 410 can translate the identified terms into a sequence including other instructions, in accordance with embodiments of the present disclosure. For example, the sequence of instructions can include instructions corresponding to other amounts of service credits to which the user is entitled based on SLA 452. In another example, the sequence of instructions can include instructions corresponding to a time period (e.g., once a day, once a week, once a month, etc.) during which a node of distributed ledger network 120 is to execute the sequence of instructions to provide the user with a service credit, in accordance with the SLA 452. The sequence of instructions can correspond to a smart contract, in accordance with previously described embodiments.

Referring back to FIG. 3, at block 314, processing logic transmits the sequence of instructions to a first node of a distributed ledger network. In an illustrative example, the first node can be node 202, described with respect to FIG. 2, and/or blockchain client 122A, described with respect to FIG. 1. In some embodiments, smart contract platform 180 can designate node 202 as a node for executing the sequence of instructions corresponding to the one or more terms of the SLA. Smart contract platform 180 can designate node 202 as a node for executing the sequence of instructions by determining one or more resources of distributed ledger network 120 that are available to execute instructions of the smart contract (e.g., a node that is not already designated for executing other instructions of the smart contract or of another smart contract) and assigning the node to execute the sequence of instructions. In some embodiments, smart contract platform 180 can store an indication of the designation at memory 450 (not shown). Smart contract platform 180 can then transmit the sequence of instructions to smart contract platform 180 to node 202. In response to receiving the sequence of instructions, node 202 can store the sequence of instructions at a local memory associated with one or more computing systems running node 202, as described above. Node 202, or another node of distributed ledger network 120 (e.g., node 204, node 206, etc.) can be configured to execute the sequence of instructions to provide the user with a service credit, in accordance with embodiments described herein.

In some embodiments, smart contract platform 180 can provide a service availability monitor 172 to user device 170 (e.g., in response to or prior to transmitting the sequence of instructions to node 202. As indicated above, service availability monitor 172 can be configured to collect data associated with a service provided to user device 170 by cloud provider 150 and provide the collected data to smart contract platform 180 and/or one or more nodes of distributed ledger network 120. The type of data collected by service availability monitor 172 can be determined based on the terms of SLA 452, in some embodiments. For example, if terms of SLA 452 provide that a service is available to user device 170 if a connection is established between user device 170 and a resource of cloud provider 150, service availability monitor 172 can collect data associated with a status of the connection during one or more time periods of a particular time interval (e.g., defined by the SLA 452). In some embodiments, smart contract platform 180 can configure service availability monitor 172 to collect a particular type of data (e.g., prior to transmitting service availability monitor 172 to user device 170). In an illustrative example, service availability monitor 172 can be configured to collect multiple types of data (e.g., as configured by smart contract platform 180). In another illustrative example, service availability monitor 172 can be configured to collect a single type of data. In such example, smart contract platform 180 can transmit one or multiple service availability monitors 172 to user device 170 (e.g., in accordance with one or more different types of data to be collected at user device 170).

As indicated above, in some embodiments, service availability monitor 172 can collect data and transmit the collected data to smart contract platform 180 (e.g., via network 102). SLA enforcement component 412 of smart contract platform 180 can determine an availability of the service based on the data received from service availability monitor 172. SLA enforcement component 412 (also referred to as "SLA enforcer 412" herein) can provide data indicating the determined availability (e.g., availability data 454) to a node of distributed ledger network 120, as described herein. In other or similar embodiments, service availability monitor 172 can determine the availability of the service and transmit data indicating the determined availability (e.g., availability data 454) to the node of distributed ledger network 120 (e.g., thus bypassing smart contract platform 180), as described herein. In yet other or similar embodiments, service availability monitor 172 can store availability data 454 at a memory that is accessible to node 202 of distributed ledger network 120 (e.g., memory 450). Node 202 can obtain the availability data 454 from memory 450, in such embodiments. In some embodiments, availability data 454 can include an indication of whether a contracted service was available at user device 170 during one or more time periods during which the contracted service is provided by cloud provider 150.

In some embodiments, service availability monitor 172 can transmit data to smart contract platform 180 and/or node 202 for each time period of a time interval, as described herein. For example, if the time interval corresponds to one hour and each time period of the time interval corresponds to a minute, service availability monitor 172 can collect and/or determine such data, as described above, and transmit such data to smart contract platform 180 and/or node 202 approximately every minute. In additional or alternative embodiments, service availability monitor 172 can transmit data to smart contract platform 180 and/or node 202 at a particular time period of a time interval. For example, if the time interval corresponds to one hour, service availability monitor 172 can collect and/or determine data for each time period of the hour (e.g., each minute of the hour) and can temporarily store such data (e.g., at a allocated region of memory of user device 170). At the final time period of the hour (e.g., at, around, or after the $59^{th}$ minute of the hour), service availability monitor 172 can transmit the temporarily stored data to smart contract platform 180 and/or node 202, in some embodiments.

In some embodiments, one or more nodes of distributed ledger network 120 can transmit a request to smart contract platform 180 and/or service availability monitor 172 to establish a secure connection (e.g., a secure network connection). The nodes can transmit the request prior to and/or after receiving the sequence of instructions from smart contract platform 180, in some embodiments.

Referring back to FIG. 3, at block 316, processing logic obtains availability data indicating an availability of the service at the user device during each time period of a time interval. In some embodiments, SLA enforcer 412 can determine the availability data 454 based on data collected by service availability monitor 172, as described above. The availability data 454 can indicate an availability of a contracted service at user device 170 during one or more time periods of a particular time interval (e.g., based on terms of SLA 452). In an illustrative example, the availability data 454 can indicate an availability of a contracted service at user device 170 during each time period (e.g., each second, each minute, etc.) of a time interval (e.g., an hour long time interval, a day long time interval, a week long time interval, etc.)

At block 318, processing logic provides the availability data to a second node of the distributed ledger network to cause the second node to execute the sequence of instructions implementing the smart contract. The second node of distributed ledger network 120 can be the same as, or otherwise correspond to, the first node (e.g., node 202), in some embodiments. In other or similar embodiments, the second node can be a different node than the first node. For example, the first node can be node 202, as described above, while the second node is node 204 and/or node 206. For purposes of example and illustration only, the second node is also referred to as node 204 herein. In some embodiments, SLA enforcer 412 can provide the availability data 454 to node 204 by transmitting availability data 454 to node 204 via network 102. In some implementations, SLA enforcer 412 can provide availability data 454 via the secure network connection, in accordance with previously described embodiments. In other or similar embodiments, SLA enforcer 412 can store availability data 454 at a memory that is accessible to node 204 (e.g., memory 450). Node 204 can access availability data 454 at the memory, as described above. As described above, node 204 can obtain the availability data 454 (e.g., directly) from service availability monitor 172, in accordance with previously described embodiments.

In response to obtaining the availability data 454, node 204 can store availability data 454 at local memory associated with node 204, as described above. Availability data 454 can be propagated to distributed ledgers of other nodes (e.g., node 202, node 206, etc.) of distributed ledger network 120, as described above. In some embodiments, node 204

(or another node of distributed ledger network 120) can determine whether to execute the sequence of instructions corresponding to the smart contract (e.g., in response to storing and/or propagating availability data 454). In one illustrative example, smart contract platform 180 can transmit a notification to execute the sequence of instructions corresponding to the smart contract in accordance with the time interval defined by SLA 452. Node 204 (and/or other nodes) can determine whether to execute the sequence of instructions by determining whether smart contract platform 180 has transmitted the notification. In another illustrative example, node 204 (and/or other nodes) can maintain a timer that is configured to track an amount of time that has passed since an initial time period of the time interval. Node 204 can determine to execute the sequence of instructions by determining that a value of the timer corresponds to a final time period of the time interval. In yet another illustrative example, node 204 can determine whether to execute the sequence of instructions by executing other instructions stored at a node (e.g., node 202, node 204, node 206, etc.) of distributed ledger network 120. The other instructions can cause one or more nodes to execute the sequence of instructions of the smart contract in response to determining that a current time corresponds to a final time period of the time interval.

In some embodiments, node 204 (and/or another node) can execute the sequence of instructions corresponding to the smart contract. Node 204 (and/or the other node) can determine that the user is entitled to a service credit based on the availability data 454 for one or more time periods of the particular time interval (e.g., as defined by SLA 452), in some embodiments. In an illustrative example, node 204 can determine that the user is entitled to a service credit (e.g., of 10%) if a total amount of time that the contracted service was unavailable during the time interval (e.g., as indicated by availability data for time periods of the interval) meets or falls below a threshold percentage, as defined by SLA 452 (e.g., 99.99%). In some embodiments, the sequence of instructions corresponding to the smart contract can cause node 204 (or another node) to apply the service credit to a payment made by the user to access the services during a subsequent time interval. Accordingly, node 204 can provide the service credit to the user by executing such instructions of the sequence of instructions.

In other or similar embodiments, node 204 (or another node) can transmit a notification to smart contract platform 180 indicating an amount of a service credit to which the user is entitled (e.g., as determined based on the execution of the sequence of instructions). Credit distribution component 414 of smart contract platform 180 can store the indicated amount of the service credit at memory 450 as service credit data 456, in some embodiments. In additional or alternative embodiments, credit distribution component 414 can transmit service credit data 456 to cloud provider 150 and/or user device 170 (e.g., via network 102). In an illustrative example, cloud provider 150 can provide the service credit to the user by providing the user device 170 with a refund of the fee paid for the service in an amount that corresponds to amount indicated by service credit data 456. In another illustrative example, cloud provider 150 can provide the service credit to the user by applying a discount to the fee paid by the user for the contracted services during a subsequent time interval. In yet another illustrative example, the user device 170, upon receipt of service credit data 456, can transmit a request to cloud provider 150 for the service credit.

In some embodiments, node 204 (or another node) can transmit a request to one or more components of smart contract platform 180 and/or service availability monitor 172 for additional availability data prior to completing execution of the sequence of instructions. For example, node 204 can determine that smart contract platform 180 and/or service availability monitor 172 has not provided a sufficient amount of availability data 454 to nodes of distributed ledger network 120 to determine whether the user is entitled to a service credit. In such example, node 204 can transmit a request to smart contract platform 180 and/or service availability monitor 172 for additional availability data 454.

FIG. 5 is a flow diagram illustrating an example method 500 for managing service level agreement breaches using distributed ledgers, in accordance with embodiments of the present disclosure. Method 400 can be performed by one or more nodes (e.g., node 202, node 204, node 206, etc.) and/or one or more blockchain clients 122 of distributed ledger network 120, in accordance with previously described embodiments. Method 500 can be performed by processing logic that can include hardware (circuitry, dedicated logic, etc.), software (e.g., software executed by a general purpose computer system or a dedicated machine), or a combination of both. Method 500 and each of its individual functions, routines, subroutines, or operations can be performed by one or more processors of the computer device executing the method. In certain implementations, method 500 can each be performed by a single processing thread. Alternatively, method 500 can be performed by two or more processing threads, each thread executing one or more individual functions, routines, subroutines, or operations of the method.

At block 510, processing logic can receive a sequence of instructions implementing a smart contract. The sequence of instructions can be generated by smart contract platform 180, as described above. In some embodiments, the sequence of instructions can be generated based on one or more terms of a SLA (e.g., SLA 452), between a user of user device 170 and a cloud provider 150, as described above.

At block 512, processing logic can store the sequence of instructions at a region of memory associated with a node of a distributed ledger network. As indicated above, a node of distributed ledger network 120 can identify a region of memory associated with a computing system that supports the node. The node can store the sequence of instructions at the identified region of memory as a block of a distributed ledger. In some embodiments, the node can propagate the sequence of instructions to other nodes of distributed ledger network 120. Each node that obtains the sequence of instructions can add the sequence as a block of the distributed ledger. In some embodiments one or more nodes of distributed ledger network 120 can apply a cryptographic has operation to the block, in accordance with previously described embodiments. In some embodiments, the node (or another node of distributed ledger network 120) can transmit a notification to smart contract platform 180 indicating that the sequence of instructions has been added to the distributed ledger.

At block 514, processing logic can receive availability data indicating an availability of a service at a user device associated with the user during one or more time periods of a particular time interval. Processing logic can receive the availability data from smart contract platform 180 and/or service availability monitor 172, as described above. Processing logic can store the received availability data as a block of the distributed ledger at one or more nodes of the distributed ledger network 120, in accordance with previously described embodiments.

At block 516, processing logic can execute the sequence of instructions to provide the user device with a service credit based on the availability data for the time interval and in accordance with the SLA. Processing logic can determine when to execute the sequence of instructions in accordance with embodiments described with respect to FIGS. 3 and 4. In some embodiments, executing the sequence of instructions can cause one or more nodes of distributed ledger network 120 to provide the user device 170 with the service credit. In other or similar embodiments, executing the sequence of instructions can cause the one or more nodes to transmit a notification of an amount of a service credit to which the user is entitled to smart contract platform 180, user device 170, and/or cloud provider 150.

Figure 6:
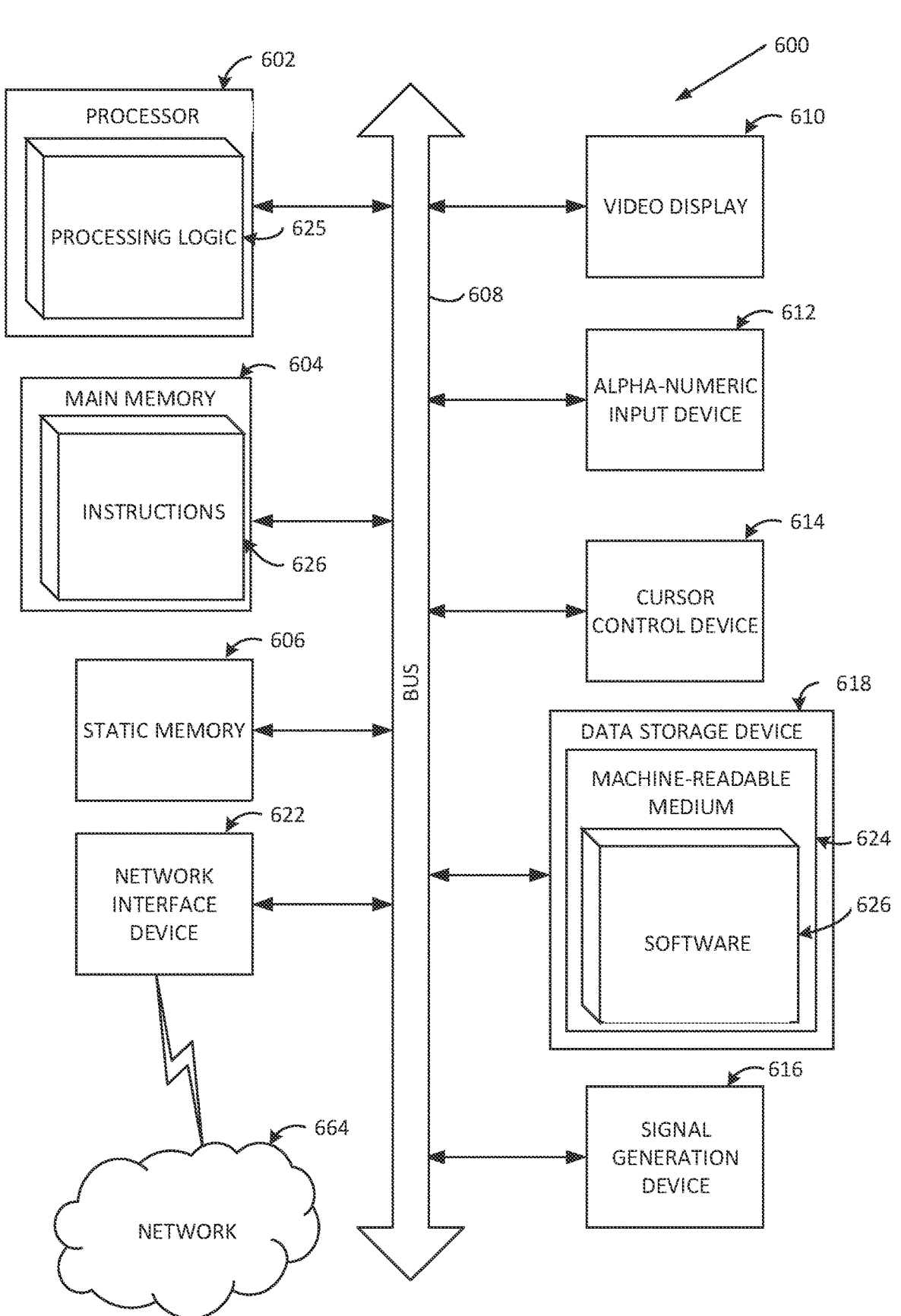
FIG. 6 is a block diagram illustrating a computing system in which implementations of the disclosure can be used.

FIG. 6 is a block diagram illustrating a computer system in which implementations of the disclosure can be used. In some implementations, the computer system 600 can support maintaining passwords for network-accessible service accounts, in accordance with previously described embodiments.

In certain implementations, computer system 600 can be connected (e.g., via a network, such as a Local Area Network (LAN), an intranet, an extranet, or the Internet) to other computer systems. Computer system 600 can operate in the capacity of a server or a client computer in a client-server environment, or as a peer computer in a peer-to-peer or distributed network environment. Computer system 600 can be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein for supporting manifest list for multi-platform application container images.

The computer system 600 includes a processing device 602, a main memory 604 (e.g., read-only memory (ROM), flash memory, dynamic random access memory (DRAM) (such as synchronous DRAM (SDRAM) or DRAM (RDRAM), etc.), a static memory 606 (e.g., flash memory, static random access memory (SRAM), etc.), and a data storage device 616, which communicate with each other via a bus 608.

Processing device 602 represents one or more general-purpose processing devices such as a microprocessor, central processing unit, or the like. More particularly, the processing device can be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is to execute the instructions 626 for performing the operations and steps discussed herein.

The computer system 600 can further include a network interface device 622 communicably coupled to a network 625. The computer system 600 also can include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

Instructions 626 can reside, completely or partially, within volatile memory 604 and/or within processing device 602 during execution thereof by computer system 600, hence, volatile memory 604 and processing device 602 can also constitute machine-readable storage medium 624. Data storage device 616 can include a computer-readable storage medium 624 (e.g., a non-transitory computer-readable storage medium) on which can store instructions 626 encoding any one or more of the methods or functions described herein, including instructions for implementing method 300 of FIG. 3 and method 500 of FIG. 5.

The non-transitory machine-readable storage medium 624 can also be used to store instructions 626 to support caching results of certain commands utilized for maintaining passwords for network-accessible service accounts described herein, and/or a software library containing methods that call the above applications. While the machine-accessible storage medium 624 is shown in an example implementation to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the disclosure. The term "machine-accessible storage medium" shall accordingly be taken to include, but not be limited to, solid-state memories, and optical and magnetic media.

Unless specifically stated otherwise, terms such as "receiving," "invoking," "associating," "providing," "storing," "performing," "utilizing," "deleting," "initiating," "marking," "generating," "transmitting," "completing," "executing," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and does not have an ordinal meaning according to their numerical designation.

Examples described herein also relate to an apparatus for performing the methods described herein. This apparatus can be specially constructed for performing the methods described herein, or it can comprise a general purpose computer system selectively programmed by a computer program stored in the computer system. Such a computer program can be stored in a computer-readable tangible storage medium.

The methods and illustrative examples described herein are not inherently related to any particular computer or other apparatus. Various general purpose systems can be used in accordance with the teachings described herein, or it can prove convenient to construct more specialized apparatus to perform methods 300 and 500 and/or each of its individual functions, routines, subroutines, or operations. Examples of the structure for a variety of these systems are set forth in the description above.

The above description is intended to be illustrative, and not restrictive. Although the disclosure has been described with references to specific illustrative examples and implementations, it should be recognized that the disclosure is not limited to the examples and implementations described. The scope of the disclosure should be determined with reference to the following claims, along with the full scope of equivalents to which the claims are entitled.

What is claimed is:

1. A method comprising:

identifying one or more terms of a service level agreement (SLA) between a user device of a computing system and a service provider of the computing system;

translating the one or more terms of the SLA into a sequence of instructions implementing a smart contract, wherein the smart contract is to provide the user device with a service credit based on an availability of a service being less than a threshold for a time period within a time interval in accordance with the SLA, wherein the sequence of instructions include instructions for a credit time period in which a first node of a distributed ledger network executes the sequence of instructions to provide the user device with the service credit;

providing the sequence of instructions to the first node of the distributed ledger network;

obtaining availability data indicating the availability of the service at the user device during each time period of the time interval; and providing the availability data to a second node of the distributed ledger network to cause the second node to execute the sequence of instructions implementing the smart contract.

2. The method of claim 1, further comprising:

receiving, from the distributed ledger network, a request to establish a secure connection between an SLA enforcement component of the computing system and the distributed ledger network, wherein the availability data is provided to the node of the distributed ledger network via the established secure connection.

3. The method of claim 1, wherein providing the availability data to the second node of the distributed ledger network comprises:

storing the availability data at a region of memory of the computing system that is accessible to the distributed ledger network.

4. The method of claim 1, further comprising:

deploying, to the user device, an availability monitoring component that is configured to monitor the availability of the service at the user device during each time period of the time interval.

5. The method of claim 1, wherein obtaining the availability data indicating the availability of the service at the user device during each time period of the time interval comprises receiving a notification comprising data collected by an availability monitoring component during each time period of the time interval, the collected data characterizing the availability of the service.

6. The method of claim 1, further comprising:

receiving, from the distributed ledger network, a request for additional information regarding the availability of the service during the time period of the time interval; and providing the additional information in response to the request.

7. The method of claim 1, wherein the distributed ledger network is a blockchain network.

8. The method of claim 1, wherein the first node is the same as the second node.

9. A system comprising:

a memory; and a processing device coupled to the memory, the processing device to perform operations comprising:

identify, by a service level agreement (SLA) enforcement component, one or more terms of a SLA between a user device of a computing system and a service provider of the computing system, wherein the service provider is to provide a service credit to the user device based on an availability of a service in accordance with the one or more terms of the SLA;

translate, by the SLA enforcement component, the one or more terms of the SLA into a sequence of instructions implementing a smart contract, wherein the smart contract is to provide the user device with a service credit based on an availability of a service being less than a threshold for a time period within a time interval for the time interval and in accordance with the SLA, wherein the sequence of instructions include instructions for a credit time period in which a first node of a distributed ledger network executes the sequence of instructions to provide the user device with the service credit;

transmit, by the SLA enforcement component, the sequence of instructions to the first node of the distributed ledger network;

obtain, by the SLA enforcement component, availability data indicating the availability of the service at the user device during each time period of the time interval; and provide, by the SLA enforcement component, the availability data to a second node of the distributed ledger network to cause the second node to execute the sequence of instructions implementing the smart contract.

10. The system of claim 9, wherein the operations further comprise:

receiving, from the distributed ledger network, a request to establish a secure connection between the SLA enforcement component and the distributed ledger network, wherein the availability data is provided to the node of the distributed ledger network via the established secure connection.

11. The system of claim 9, wherein providing the availability data to the second node of the distributed ledger network comprises:

storing the availability data at a region of memory of the computing system that is accessible to the distributed ledger network.

12. The system of claim 9, wherein the operations further comprise:

deploying, to the user device, an availability monitoring component that is configured to monitor the availability of the service at the user device during each time period of the time interval.

13. The system of claim 9, wherein obtaining the availability data indicating the availability of the service at the user device during each time period of the time interval comprises receiving a notification comprising data collected by an availability monitoring component during each time period of the time interval, the collected data corresponding to the availability of the service.

14. The system of claim 9, wherein the operations further comprise:

receiving, from the distributed ledger network, a request for additional information regarding the availability of the service during the time period of the time interval; and providing the additional information in response to the request.

15. The system of claim 9, wherein the distributed ledger network is a blockchain network.

16. A non-transitory computer readable storage medium including instructions that, when executed by a processing device, cause the processing device to perform operations comprising:

identify, by a service level agreement (SLA) enforcement component, one or more terms of the SLA between a user device of a computing system and a service provider of the computing system, wherein the service provider is to provide a service credit to the user device based on an availability of a service in accordance with the one or more terms of the SLA;

translate, by the SLA enforcement component, the one or more terms of the SLA into a sequence of instructions implementing a smart contract, wherein the smart contract is to provide the user device with a service credit based on an availability of a service being less than a threshold for a time period within a time interval in accordance with the SLA, wherein the sequence of instructions include instructions for a credit time period in which a first node of a distributed ledger network executes the sequence of instructions to provide the user device with the service credit;

transmit, by the SLA enforcement component, the sequence of instructions to the first node of the distributed ledger network;

obtain, by the SLA enforcement component, availability data indicating the availability of the service at the user device during each time period of the time interval; and provide, by the SLA enforcement component, the availability data to a second node of the distributed ledger network to cause the second node to execute the sequence of instructions implementing the smart contract.

17. The non-transitory computer readable storage medium of claim 16, wherein the operations further comprise:

receiving, from the distributed ledger network, a request to establish a secure connection between the SLA enforcement component and the distributed ledger network, wherein the availability data is provided to the node of the distributed ledger network via the established secure connection.

18. The non-transitory computer readable storage medium of claim 16, wherein providing the availability data to the second node of the distributed ledger network comprises:

storing the availability data at a region of memory of the computing system that is accessible to the distributed ledger network.

19. The non-transitory computer readable storage medium of claim 16, wherein the operations further comprise:

deploying, to the user device, an availability monitoring component that is configured to monitor the availability of the service at the user device during each time period of the time interval.

20. The non-transitory computer readable storage medium of claim 16, wherein obtaining the availability data indicating the availability of the service at the user device during each time period of the time interval comprises receiving a notification comprising data collected by an availability monitoring component during each time period of the time interval, the collected data characterizing the availability of the service.

* * * * *